(12) United States Patent
Ahn et al.

(10) Patent No.: US 11,502,372 B2
(45) Date of Patent: Nov. 15, 2022

(54) POROUS FILM, SEPARATOR COMPRISING SAME, AND ELECTROCHEMICAL CELL

(71) Applicant: SAMSUNG SDI CO., LTD., Yongin-si (KR)

(72) Inventors: Sunghee Ahn, Yongin-si (KR); Hana Ra, Yongin-si (KR); Suhak Bae, Yongin-si (KR); Minjeong Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 637 days.

(21) Appl. No.: 16/491,366

(22) PCT Filed: Mar. 6, 2018

(86) PCT No.: PCT/KR2018/002649
§ 371 (c)(1),
(2) Date: Sep. 5, 2019

(87) PCT Pub. No.: WO2018/164454
PCT Pub. Date: Sep. 13, 2018

(65) Prior Publication Data
US 2020/0035972 A1 Jan. 30, 2020

(30) Foreign Application Priority Data

Mar. 7, 2017 (KR) .................. 10-2017-0029011

(51) Int. Cl.
*H01M 50/411* (2021.01)
*C08J 9/26* (2006.01)
(Continued)

(52) U.S. Cl.
CPC ......... *H01M 50/411* (2021.01); *C08J 5/2231* (2013.01); *C08J 9/0061* (2013.01);
(Continued)

(58) Field of Classification Search
CPC ............. H01M 50/411; H01M 10/052; H01M 50/449; H01M 50/417; H01M 50/443;
(Continued)

(56) References Cited

U.S. PATENT DOCUMENTS 5,362,582 A 11/1994 Chang et al.
6,666,969 B1 * 12/2003 Funaoka ............. H01M 50/494
210/500.36
(Continued)

FOREIGN PATENT DOCUMENTS

CN 103180373 A 6/2013
CN 104620417 A 5/2015
(Continued)

OTHER PUBLICATIONS

International Search Report for PCT/KR2018/002649 filed on Mar. 6, 2018.
(Continued)

*Primary Examiner* — Kara B Boyle
(74) *Attorney, Agent, or Firm* — Lee IP Law, P.C.

(57) ABSTRACT

The present invention relates to a porous film including polyethylene and pore-forming particles, wherein the porous film has a structure including lamella and fibril, and the average size of pores located inside the porous film is larger than the average size of pores located on the surface of the porous film; a separator including the same; and an electrochemical cell.

20 Claims, 9 Drawing Sheets

(51) Int. Cl.
  *H01M 10/052* (2010.01)
  *C08J 5/22* (2006.01)
  *C08J 9/00* (2006.01)
  *H01M 50/449* (2021.01)

(52) U.S. Cl.
  CPC ............ *C08J 9/26* (2013.01); *H01M 10/052* (2013.01); *H01M 50/449* (2021.01); *C08J 2201/0442* (2013.01); *C08J 2205/042* (2013.01); *C08J 2205/044* (2013.01); *C08J 2323/06* (2013.01); *C08J 2423/06* (2013.01)

(58) Field of Classification Search
  CPC ............ H01M 5/446; H01M 10/0525; H01M 50/489; H01M 50/491; Y02E 60/10; C08J 5/2231; C08J 9/0061; C08J 9/26; C08J 2201/0442; C08J 2205/042; C08J 2205/044; C08J 2323/06; C08J 2423/06; C08J 5/22; C08J 5/2275; C08F 2/10; C08F 2500/18; C08L 23/06
  See application file for complete search history.

(56) References Cited

U.S. PATENT DOCUMENTS

| | | | |
|---|---|---|---|
| 2005/0058823 A1* | 3/2005 | Funaoka | B01D 71/26 264/41 |
| 2009/0087749 A1* | 4/2009 | Takita | H01M 50/411 264/424 |
| 2009/0148761 A1 | 6/2009 | Kikuchi et al. | |
| 2010/0151310 A1* | 6/2010 | Takita | B01D 67/0074 264/49 |
| 2012/0015229 A1 | 1/2012 | Ohashi et al. | |
| 2012/0115008 A1 | 5/2012 | Sano et al. | |
| 2013/0029126 A1 | 1/2013 | Yen | |
| 2013/0171499 A1 | 7/2013 | Yang et al. | |
| 2013/0256933 A1* | 10/2013 | Takita | H01M 50/417 264/41 |
| 2015/0318528 A1 | 11/2015 | Iwai et al. | |
| 2016/0149185 A1 | 5/2016 | Yoon et al. | |
| 2016/0172645 A1 | 6/2016 | Lee et al. | |
| 2016/0218340 A1 | 7/2016 | Ryu et al. | |
| 2016/0285062 A1 | 9/2016 | Jo et al. | |
| 2017/0069893 A1 | 3/2017 | Ahn et al. | |

FOREIGN PATENT DOCUMENTS

| | | | |
|---|---|---|---|
| CN | 105594014 A | | 5/2016 |
| CN | 105702902 A | | 6/2016 |
| JP | 01-294353 A | | 11/1989 |
| JP | 3347854 B2 | | 11/2002 |
| JP | 2004-149637 A | | 5/2004 |
| JP | 3654634 B2 | | 6/2005 |
| JP | 2009-211946 A | | 9/2009 |
| JP | 2009211946 A | * | 9/2009 |
| JP | 2011-192529 A | | 9/2011 |
| JP | 5164396 B2 | | 3/2013 |
| KR | 10-2008-0085922 A | | 9/2008 |
| KR | 10-2011-0114720 A | | 10/2011 |
| KR | 10-1183912 B1 | | 9/2012 |
| KR | 10-1251437 B1 | | 4/2013 |
| KR | 10-2014-0023303 A | | 2/2014 |
| KR | 10-2015-0037393 A | | 4/2015 |
| KR | 10-2015-0070979 A | | 6/2015 |
| KR | 10-2016-0051111 A | | 5/2016 |
| KR | 10-1646101 B1 | | 8/2016 |
| KR | 10-2016-0115557 A | | 10/2016 |
| KR | 10-2016-0129581 A | | 11/2016 |
| KR | 101924988 B1 | * | 11/2016 |
| KR | 10-2017-0029399 A | | 3/2017 |
| TW | 200710137 A | | 3/2007 |
| WO | WO 2007/098339 A2 | | 8/2007 |

OTHER PUBLICATIONS

Chinese Office dated Sep. 3, 2021 and Search Report dated Aug. 26, 2021.
Chinese Office Action dated Mar. 21, 2022, for corresponding Chinese Patent Application No. 201880016378.7.
European Search Report dated Dec. 11, 2020.
Chinese Notice of Allowance and Search Report dated Aug. 3, 2022.

* cited by examiner

POROUS FILM, SEPARATOR COMPRISING SAME, AND ELECTROCHEMICAL CELL

CROSS-REFERENCE TO THE RELATED APPLICATION

This is the U.S. national phase application based on PCT Application No. PCT/KR2018/002649, filed Mar. 6, 2018, which is based on Korean Patent Application No. 10-2017-0029011, filed Mar. 7, 2017, the entire contents of all of which are hereby incorporated by reference.

TECHNICAL FIELD

A porous film, a separator including the same, and an electrochemical cell are disclosed.

BACKGROUND ART

A separator for an electrochemical cell is a porous film as an interlayer separating positive and negative electrodes in the cell and thus maintaining ion conductivity and charging and discharging the cell.

This porous film is manufactured in a method of a dry process and a wet process. The wet process is a method of mixing a polymer material with a plasticizer, extruding the mixture into a sheet, and removing the plasticizer from the sheet to form a pore. In the wet process, since a pore size is determined by a type of a plasticizer and compatibility of the polymer material with a plasticizer, sizes of the pores may be uniform but it is difficult to apply the same process to materials other than polyethylene, and there are problems that a solvent for extracting the plasticizer is harmful to human body and the environment, and drawbacks that processability and economy are not good.

The dry process is a method of forming a precursor film through extrusion, adjusting alignment of lamellas through a heat-treatment and the like to, and then, drawing the precursor film to form a pore. The dry process disclosed in Korean Patent Laid-Open Publication No. 2008-0085922 uses no extraction solvent unlike the wet process and thus is environmentally-friendly and competitive in terms of price but has a problem of having a low drawing rate and deteriorating tensile strength in a horizontal direction, since a pore is formed between crystalline materials and non-crystalline materials by drawing a single material.

In the dry process, a pore size is determined by an intensity difference between the crystalline materials and non-crystalline materials, so the pore size tends to be determined by types of materials. Generally, a porous film produced by a dry process using polyethylene has an excessively large pore size and thus may not be used as a separator. Therefore, a polypropylene porous film having a small pore size is used alone, or a polyethylene porous film is combined with a polypropylene porous film to provide a separator having a shutdown function. However, the polypropylene porous film has poor producibility and workability as compared with polyethylene porous film, and there are limits for a use of an organic solvent in preparation of a coated separator in order to improve heat resistance, and there are drawbacks that a separator function such as a shutdown function may not be available.

DISCLOSURE

Technical Problem

A porous film is a high density polyethylene porous film manufactured by dry process, is environmentally-friendly, has good producibility and workability, and has a good pore size and distribution to be suitable for use as a separator. Specifically, the porous film maximizes sizes of inner pores and thus maximizes mobility of transferring materials in the cell while minimizes pore sizes on the surface and thus maintains characteristics as a separator, thereby improving output characteristics of a cell. In other words, provided are a porous film having improved permeability, porosity, tensile strength, and thermal stability while being easily manufactured and having good production efficiency, and a separator including the same. An electrochemical cell having improved safety and long-term reliability, as well as output characteristics is provided.

Technical Solution

In an embodiment, a porous film includes polyethylene and pore-forming particles, wherein the porous film has a structure including lamella and fibril and the average size of pores located inside the porous film is larger than the average size of pores located on the surface of the porous film.

In an embodiment, a separator including the porous film is provided.

In an embodiment, an electrochemical cell including the separator is provided.

Advantageous Effects

The porous film according to an embodiment has a simple manufacturing process, good production efficiency, and excellent permeability, porosity, tensile strength, and thermal stability. The porous film maximizes inner pores and thus maximizes mobility of transferring materials in a cell while minimizes pore sizes on the surface and thus maintains characteristics of a porous film required for a separator, thereby improving output characteristics of a cell including the same.

An electrochemical cell according to an embodiment including the porous film having easily controlled porosity has excellent output characteristics, safety, and long-term reliability.

MODE FOR INVENTION

Embodiments will hereinafter be described in detail, and may be easily performed by a person skilled in the related art. However, this invention may be embodied in many different forms and is not to be construed as limited to the embodiments set forth herein.

When a definition is not otherwise provided, "combination thereof" refers to a mixture, a stack structure, a composite, a copolymer, an alloy, a blend, a reaction product of components.

In an embodiment, a porous film includes polyethylene and pore-forming particles and has a structure including lamella and fibril wherein the average size of pores located inside the porous film is larger than the average size of pores located on the surface of the porous film.

Figure 1:
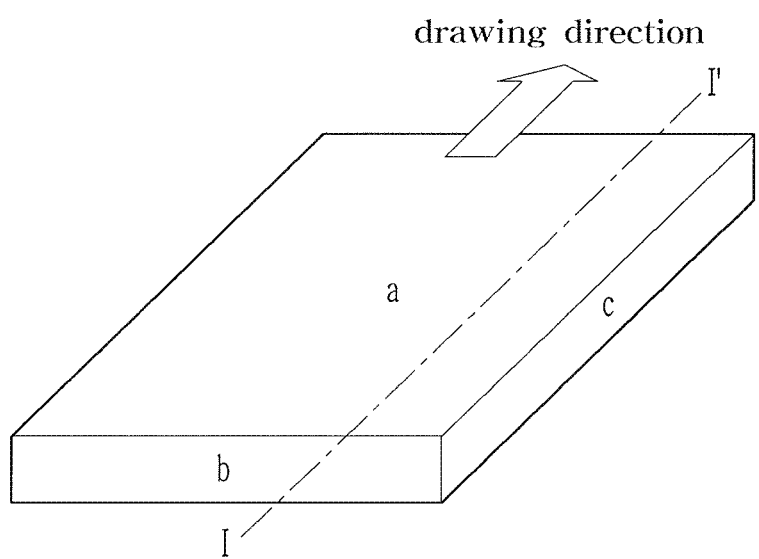
FIG. 1 is a schematic stereoscopic view of a porous film according to an embodiment.
Figure 2:
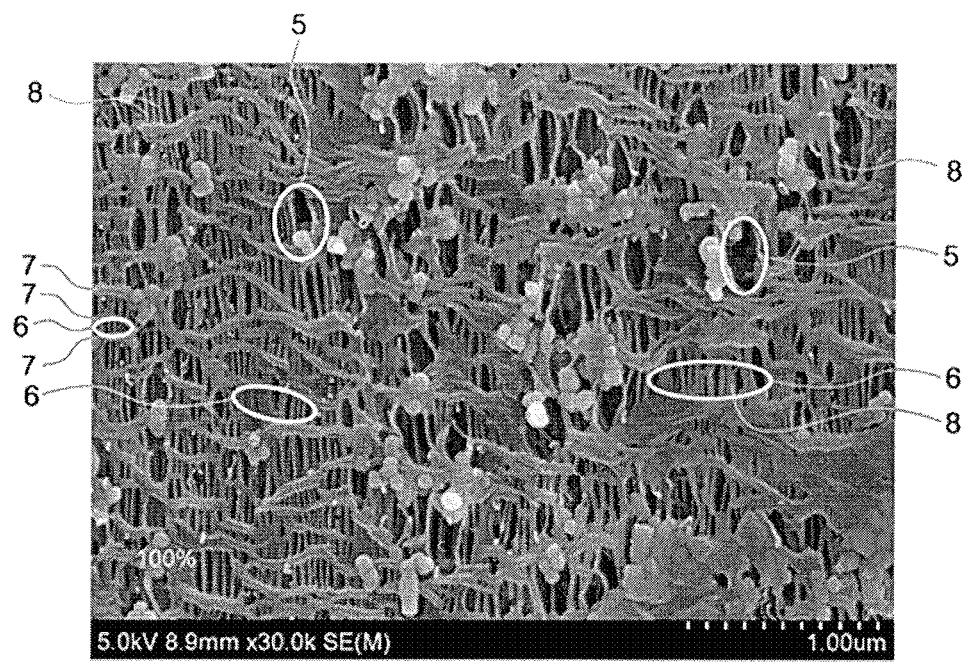
FIG. 2 is a scanning electron microscope (SEM) image of the surface of the porous film manufactured in Example 1.
Figure 3:
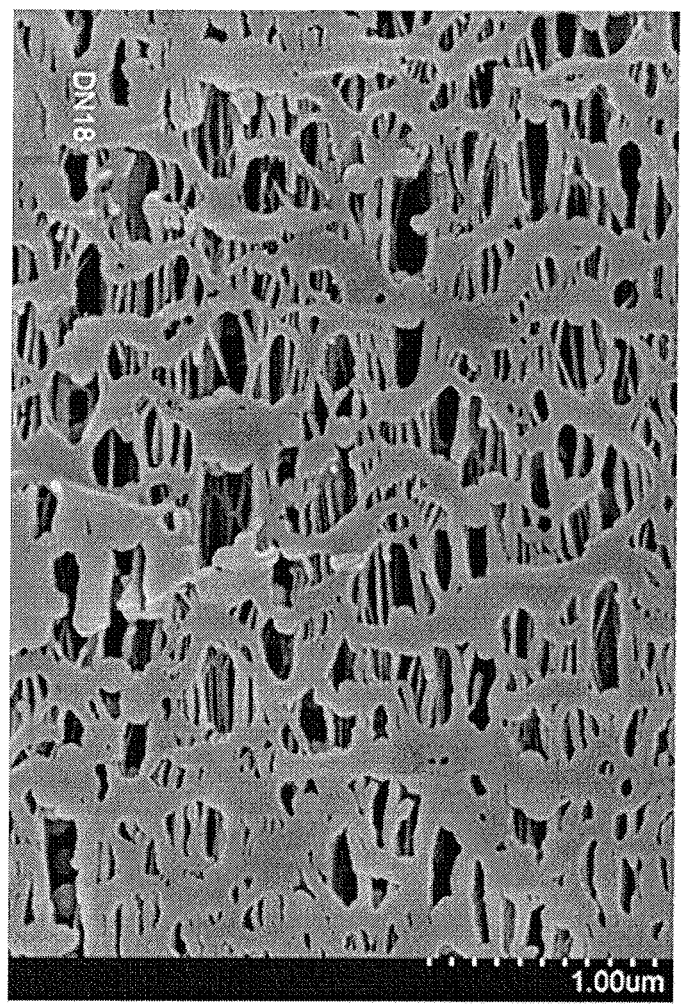
FIG. 3 is a SEM photograph of a cross-section of the porous film manufactured in Example 1 taken along the line I-I'.

FIG. 1 is a stereoscopic view schematically showing a structure of a porous film. FIG. 2 is a SEM photograph of the surface of the porous film manufactured in Example 1 which will be described later, which is a photograph of the a plane taken from the top. FIG. 3 is a cross-sectional SEM photograph of the porous film manufactured in Example 1, showing the internal structure of the porous film, and is a photograph of the cross-section of the porous film of FIG. 1 taken along line I-I'.

A porous film according to an embodiment of the present invention has a lamellar and fibril structure. In FIGS. 2 and 3, a structure in which a plurality of fibrils 8 are formed between lamellar 7 and lamellar 7 is confirmed. Comparing FIG. 2 showing the surfaces of the porous film with FIG. 3 showing inner of the porous film, the pore size shown in FIG. 3 is larger than the pore size shown in FIG. 2.

That is, in the porous film according to an embodiment, a relatively small pore is formed densely on the surface and a relatively large pore is sparsely formed inside. Accordingly, the porous film according to an embodiment may exhibit improved characteristics such as permeability, tensile strength, and thermal stability, and the like, while having improved ion conductivity.

The pores may have a slit or oval shape and may have a major axis and a minor axis. The average size of the pores may mean an average length of a major axis of the pores, an average length of a minor axis of the pores, or both. For example, an average length of a minor axis of the pores inside the porous film may be larger than an average length of a minor axis of the pores on the surface of the porous film. In addition, an average length of a major axis of the pores inside the porous film may be larger an average length of a major axis of the pores on the surface of the porous film.

A size of the pores may be obtained by randomly selecting 20 pores from the pores shown in each SEM image of the surface and the cross section of the porous film according to an embodiment of the present invention, measuring a major axis or minor axis of a pore, when the pore is oval, or a diameter of a pore, when the pore is a circle, and averaging the other measurements except for the largest and smallest ones. For example, the average length of the minor axis may be obtained by randomly selecting 20 pores from the pores shown in each SEM image of the surface and the cross section of the porous film, measuring a length of a minor axis of the pores, and calculating an average of the rest of the measurement except for the largest and smallest ones. The average length of the major axis may be obtained in the same method as above. In the present invention, the surface pores of the porous film are observed through a SEM image with respect to the surface of the porous film. As for the inner pores, an average size thereof may be obtained by randomly selecting about 20 pores from the pores distributed in the other areas except for 10% of a thickness from the surface of the porous film out of the total thickness on the cross section of a thickness direction and then, averaging pore sizes measured in the aforementioned method.

A ratio of the average size of pores inside the porous film relative to the average size of pores on the surface of the porous film (average size of inner pores/average size of surface pores) may be 1.1 to 20, for example 1.2 to 19, or 1.3 to 18, specifically 1.3 to 10, and more specifically 2 to 10. More specifically, it may be 1.3 to 5 with reference to a major axis, and may be 2 to 10 with reference to a minor axis. When the ratio of the surface and inner pore sizes satisfies the ranges, the porous film may exhibit excellent ion conductivity and permeability, tensile strength, and thermal stability.

Herein, the average size of the pores may mean either an average length of the major axis of the pore, an average length of the minor axis of the pore, or both.

Specifically, the average length of the minor axis of the pores located on the surface of the porous film may be 5 nm to 300 nm, for example 10 nm to 250 nm, or 15 nm to 200 nm. In addition, the average length of the minor axis of the pores located inside the porous film may be 10 nm to 400 nm, for example from 20 nm to 350 nm, or from 40 nm to 300 nm, or from 60 nm to 250 nm. When the surface and inner pores of the porous film satisfy the average length of the minor axis as described above, the porous film may exhibit excellent ion conductivity, permeability, tensile strength and thermal stability.

In addition, the average length of the major axis of the porous surface of the porous film may be from 40 nm to 500 nm, for example from 60 nm to 450 nm, or from 80 nm to 400 nm. The average length of pores of the porous film may be from 40 nm to 600 nm, for example from 60 nm to 500 nm, or from 80 nm to 400 nm. When the surface and inner pores of the porous film satisfy the average lengths of the major axis as described above, the porous film may exhibit excellent ion conductivity, permeability, tensile strength, and thermal stability.

Comparing FIG. 2 showing the surfaces of the porous film with FIG. 3 showing inner of the porous film, a thickness of the lamellar in FIG. 3 is larger than a thickness of the lamellar in FIG. 2. The thickness of the lamellar located on the surface of the porous film of FIG. 2 may be about 10 nm to 200 nm, for example 10 nm to 160 nm or 20 nm to 120 nm. On the other hand, the thickness of the lamellar located inside the porous film of FIG. 3 may be about 20 nm to 500 nm, for example 30 nm to 400 nm or 50 nm to 300 nm. Thus, by having lamellar having different thicknesses on the surface and inside, the porous film may exhibit excellent ion conductivity, permeability, tensile strength, and thermal stability.

The thickness of the lamellar on the surface of and inside the porous film according to an embodiment is thinner than the thickness of the lamellar (about 300 nm or greater) of the porous films produced by conventional dry processes. In porous films made by conventional dry processes, lamellar usually shows a layered structure of greater than or equal to 10 layers. On the other hand, in the porous film, the lamellar may have a layered structure of less than 5 layers. Accordingly, the porous film may exhibit improved permeability and ion conductivity, making it suitable for use as a separator for electrochemical cells.

On the other hand, referring to FIG. 2, the porous film includes the first pores 5 formed by the pore-forming particles and the second pores 6 formed between the lamellar 7 on the surface of the polyethylene. The lamellar 7 and the neighboring lamellar 7 are connected to a plurality of fibrils 8, and the second pores 6 may be pores formed between neighboring fibrils 8. The average size of the first pores may be larger than the average size of the second pores, and the volume of the first pores may be larger than the volume of the second pores. The porous film includes both first and second pores having a different size on the surface, so that the porous film may have adequate permeability and ion conductivity, and ensure all the properties required for the separator, including tensile strength and thermal stability.

Specifically, an average size of the first pores may be about 4 times to 30 times, for example, about 4 times to 25 times as large as that of the second pores. In other words, a ratio of the average size of the second pores relative to that of the first pores (the average size of the second pores/the average size of the first pores) may be in a range of about 0.05 to 0.2, for example, about 0.06 to 0.15. Herein, the average size of the first pores and the average size of the second pores may be an average length of a major axis or an average length of a minor axis of the first pores, the second pores, or both thereof. For example, the average length of the minor axis of the first pores may be 4 times to 30 times or 4 times to 25 times as large as the average length of the minor axis of the second pores. When the size ratio of the first pores and the second pores satisfies the ranges, the porous film has appropriate ion conductivity and tensile strength and thus may be appropriately used as a separator. For example, when the average size of the first pores is greater than 30 times as large as that of the second pores, strength of the film may be sharply deteriorated, and when the film is used as a separator for an electrochemical cell, there may be a lithium ion elution problem, and since growth of lithium dendrite is promoted and thus generates a short circuit and the like, there may be a cell safety problem.

In addition, the ratio of average length of the major axis of the first pores relative to that of the minor axis thereof (the average length of the major axis/the average length of the minor axis) may be about 1.1 to 7, 1.5 to 6, or 2 to 5, and a ratio of the average length of the major axis of the second pores relative to that of the minor axis thereof may be larger than that of the first pores, for example, 4 to 30, or 4 to 25, or 5 to 20. When the first pores and the second pores respectively have the length ratios of the minor axis and the major axis, the porous film may show appropriate permeability and ion mobility.

The average size of the pores on the surface of the porous film may be an average size of all the pores including the first pores and the second pores on the surface thereof. In other words, the average size of the pores inside the porous film may be larger than that of the first and second pores on the surface of the porous film. Or, the average size of the pores inside the porous film may be larger than that of the first pores on the surface of the porous film and in addition, larger than that of the second pores on the surface of the porous film.

The resin constituting the porous film may be polyethylene, and among them, high density polyethylene (HDPE) having density of greater than 0.95 g/cm$^3$, for example, high density having density of greater than 0.953 g/cm$^3$. By using high density polyethylene having density of greater than 0.95 g/cm$^3$, the porous film having the aforementioned specific structure and pore distribution may be obtained, and in addition all the properties required for separators such as excellent permeability, porosity, tensile strength, and thermal stability may be obtained and a manufacturing process of the porous film may be also simplified and production efficiency may be increased. For example, the polyethylene, compared with polyethylene having density of less than or equal to 0.95 g/cm$^3$, has an appropriate thickness of lamellar and fibril, pore size, pore distribution, and the like, much satisfactory morphology, and excellent properties such as tensile strength and permeability as a separator. In addition, when the high density polyethylene is used, compared with when other olefin resins such as polypropylene and the like are used, improved processability and production efficiency, excellent separator characteristics such as tensile strength, thermal stability, and the like, and a shutdown function are obtained. A crystallinity of the polyethylene may be 17% to 96%, for example 30% to 96%, or 50% to 96%. By using polyethylene having the crystallinity within the ranges, lamellar and fibril of appropriate thickness and good condition may be formed, and a porous film having the aforementioned specific pore distribution may be obtained.

A melt index (2.16 kg/190° C., ASTM D1238) of the polyethylene may be 0.001 to 10, for example 0.001 to 5, or 0.001 to 3. By using polyethylene that meets the melt index within the ranges, the processability may be improved by increasing a film draw rate.

The porous film may include one or more types of polyethylene having a density of greater than 0.95 g/cm$^3$, and may further include other resins besides the high density polyethylene, for example, other polyolefin resins, fluorinated resins, polyimide, polyamide, polyester, polyetherimide, polyamideimide, polyacetal, and the like. For example, the polyethylene may be blended with other resins, or the polyethylene may be copolymerized with other olefin monomer or non-olefin monomer.

The pore-forming particles may be inorganic particles, organic particles, or composite particles thereof.

Examples of the inorganic particles may be alumina, silica, titania, zirconia, magnesia, ceria, zinc oxide, iron oxide, silicon nitride, titanium nitride, boron nitride, calcium carbonate, barium sulfate, aluminum sulfate, aluminum hydroxide, magnesium hydroxide, barium titanite, calcium titanite, talc, calcium silicate, magnesium silicate, boehmite, and the like.

Examples of the organic particles may be a polymerization product of monomers including a double bond made by an emulsion polymerization or suspension polymerization method, or a cross-linked polymerization product, or a polymer precipitate produced in a solution by controlling compatibility. The organic particles may for example include a polymer such as polystyrene (PS), polyethylene (PE), polypropylene (PP), polyvinylidene fluoride (PVdF), polytetrafluoroethylene (PTFE), polyurethane (PU), polymethylpentene (PMP), polyethylene terephthalate (PET), polycarbonate (PC), polyester, polyvinyl alcohol (PVA), polyacrylonitrile (PAN), polymethylene oxide (PMO), polymethylmethacrylate (PMMA), polyethylene oxide (PEO), polyamide (PA), a silicone rubber, polyamideimide (PAI), polysulfone (PSF), polyethylsulfone (PES), polyphenylene sulfide (PPS), polyarylate (PAR), polyimide (PI), polyaramid (PA), cellulose, and the like or a copolymer of the two types or more, a cellulose modified product, a melamine-based resin, and a phenol-based resin. The components of the organic particles may be cross-linked or non-cross-linked.

The organic particles may be specifically at least one selected from a silicon acryl-based rubber, an ethylene-methylacrylate copolymer, polystyrene (PS), an acrylonitrile-styrene copolymer, an acrylic copolymer, a styreneacrylate copolymer, polyethylene (PE), polypropylene (PP), polysulfone (PSF), and polyimide (PI), which are cross-linking treated.

A size of the pore-forming particles may be controlled to adjust the pores on the surface of and the pores inside the porous film to have a different size. In addition, the pore-forming particles having high size uniformity may be used to secure uniformity of the pores.

The size of the pore-forming particles should be adjusted according to a crystalline resin used therewith, for example, a thickness of lamellar formed from the crystalline resin. The size of the pore-forming particles may be 0.1 times to 30 times, for example, 0.5 times to 20 times or 1 time to 10 times as large as a thickness of the lamellar formed from the crystalline resin. The pore-forming particles used with the polyethylene resin having density of greater than 0.95 g/cm$^3$ in an embodiment may have an average particle diameter of 5 nm to 300 nm, for example, 5 nm to 250 nm, 5 nm to 200 nm, or 10 nm to 100 nm. When the pore-forming particles satisfying the average particle diameter ranges are used, the pore-forming particles may be uniformly dispersed in a polymer and prevent an agglomeration phenomenon, form the first pores having an appropriate size without intervening formation of the second pores, pores among lamellars, and furthermore, contribute to forming morphology of a porous film whose surface pores and inner pores have a different size. In other words, the pore-forming particles having the average particle diameter range may have a merit in terms of size adjustment of the surface pores and the inner pores of the porous film, and uniformity and permeability of the pores.

For example, when the average particle diameter is smaller than 5 nm, the pore-forming particles may hardly be uniformly dispersed in a polymer but agglomerated and form an aggregate and thus have an effect of introducing a particle having a large diameter and accordingly, may not participate in lamellar array and not make a size difference between the surface pores and the inner pores. In addition, when the average particle diameter is for example greater than 300 nm, the pore-forming particles may not participate in the lamellar array of polyethylene, but eventually, the surface pores and the inner pores are excessively enlarged. Accordingly, when the porous film is used as a separator for an electrochemical cell, lithium ions are eluted and thus cause easy discharge of the cell and sharp deterioration of an open circuit voltage (OCV), or a short circuit occurs due to growth of lithium dendrite and causes a safety problem, and accordingly, a function as the separator is deteriorated.

Uniformity adjustment of the pore-forming particle size plays an important role for pore uniformity of the porous film. When a hallow pore portion having a diameter of greater than or equal to 2 μm inside the porous film is formed, partial strength deterioration due to the hallow pore portion and partial electrode material maldistribution due to nonuniformity in the charge and discharge may bring about a problem of increasing defects during the use of a cell. This problem may be prevented by using the pore-forming particles having the aforementioned average particle diameter range.

The pore-forming particles may be surface-treated, for example, treated to have liophophilic property on the surface, wherein the pore-forming particles may have excellent dispersibililty in a polymer or a composition including the same, and accordingly, a porous film having uniform porosity may be obtained.

The pore-forming particles may be included in an amount of 2.5 parts by volume to 40 parts by volume, for example, 5 parts by volume to 30 parts by volume, or 10 parts by volume to 20 parts by volume based on a total volume of the porous film. When the pore-forming particles are included within the range, density, attachability, uniformity, and the like of the pores are secured, and thus permeability, mechanical strength, and thermal stability of the porous film are improved, and in addition, the pores having a different size on the surface of the porous film and thereinside may be formed, and processability may be improved.

The porous film may include an antioxidant, a flow controlling agent, an antistatic agent, a neutralizer, a dispersing agent, an antiblock agent, a slip agent, and the like in an appropriate amount as needed.

The porous film according to an embodiment may have porosity of 30% to 70%, for example, 35% to 65%, and unit permeability obtained by dividing permeability of the porous film by a thickness of the separator may be less than or equal to 400 sec/100 cc·μm, for example, less than or equal to 300 sec/100 cc·μm, or in a range of 150 sec/100 cc·μm to 300 sec/100 cc·μm. Within the range, sufficient permeability is secured, and accordingly, as ion conductivity is improved, output characteristics of a cell may be improved.

In addition, the porous film may have a thickness of 1 μm to 30 μm, 2 μm to 25 μm, or 3 μm to 20 μm, and a thickness deviation may be less than 30% of the thickness.

Hereinafter, a method of manufacturing the porous film according to an embodiment is described.

A method of manufacturing the porous film includes extrusion-molding a composition including polyethylene and pore-forming particles to form a precursor film, annealing the precursor film at a temperature of $(T_m-80)$ ° C. to $(T_m-3)$ ° C., and 50% to 400% drawing the annealed film at 0° C. to 50° C. Herein, the refers to a melting temperature of the polyethylene.

First, a composition including polyethylene having density of greater than 0.95 g/cm$^3$ and pore-forming particles is extrusion-molding in an extruder to manufacture a precursor film. This extrusion-molding method has no particular limit but may provide a film by using a single or twin screw extruder and a T or circular die and melting the composition. For example, each component such as the polyethylene and pore-forming particles, and the like are melted, knead, extruded and discharged and then solidified by casting to form a uniform precursor film. For example, the composition including the polyethylene and pore-forming particles is compounded into a pellet and the pellet is put in a hopper of an extruder equipped with a T die and then, extruded through the extruder set at 170° C. to 250° C.

The extruded product may be formed into a precursor film by adjusting a draw ratio in a range of 30 to 200, for example, 40 to 200 through a casting roll set at $(T_m-120)$ ° C. to $(T_m-10)$ ° C. When the pore-forming particles are introduced, a crystallization rate of the polyethylene may be improved by the particles, and accordingly, since a size of crystal grains is smaller, an appropriate draw ratio for realizing appropriate morphology may be in a smaller range. Accordingly, the morphology may be realized at 30 which is smaller than a draw ratio in a general dry process. When the draw ratio is lower than 30, directivity of a crystalline phase becomes small, and accordingly, desired morphology may not be realized. In order to obtain a crystal structure having an improved orientation, the draw ratio needs to be as high as possible in the dry process, that is, greater than or equal to 300, but sufficient-leveled morphology may be realized at the draw ratio of less than or equal to 200 due to an influence of the aforementioned pore-forming particles. When the draw ratio is greater than 200, a fracture may occur in the drawing process.

A thickness of the precursor film may be 1 μm to 500 μm, for example, 5 μm to 300 μm, or 5 μm to 100 μm, or 5 μm to 40 μm, or 5 μm to 30 μm. For example, at least two extruded precursor films may be united to form a multi-layered precursor film or at least two multi-layered precursor films may be formed through a coextrusion. In the case of two or more multi-layer precursor films, melting points of the polyethylene, contents of the particles, types of the particles in each layer may be the same or different.

Subsequently, the extruded/molded non-porous precursor film may be annealed at Tm-80° C. to Tm-3° C. The annealing is a heating process for promoting formation of micropores during drawing by improving a crystal structure and an alignment structure through a heat treatment. If the draw ratio is properly adjusted to a value of greater than or equal to 30, the annealing process may be shortened or eliminated. For example, the annealing may be performed by heat-treating a roll of a substrate in a convention oven, contacting with a heated roll or metal plate, or applying heat to the extruded/molded substrate through hot air of a tenter and the like, or an infrared heater. The annealing temperature and time may be adjusted depending on a draw ratio during formation of the precursor film, and for example, a polyethylene resin may be annealed at 80° C. to 135° C. which is 3° C. to 80° C. lower than the melting temperature (Tm) of the polyethylene resin.

Then, the annealed film may be 30% to 400%, and specifically 30% to 200% first drawn at a low temperature and then may be subjected to a stress-relief process. The low temperature drawing process is a process of forming a uniform pore by forming a primary pore between a particle and a polymer and inducing crazing, a secondary pore, therefrom all over the entire region of the film and may realize small pores of a surface layer which cannot be obtained in the conventional dry process. For example, it may be performed by for example using a draw roll in one axis (e.g., a MD direction). A temperature for the low temperature drawing may vary depending on characteristics of the precursor film but, for example, be in a range of (glass transition temperature −50) ° C. to (glass transition temperature +160) ° C. and specifically, in a range of 0° C. to 60° C. or 10° C. to 50° C. When the draw ratio is less than 30%, uniform pores are not formed in the precursor film, and when the draw ratio is greater than or equal to 400%, a fracture may easily occur and thus deteriorate processability. The stress relaxation process may be performed between $(T_m-60)$ ° C. and $(T_m-3)$ ° C. of the precursor film, for example, in a range of 100° C. to 135° C. or 105° C. to 135° C. When the draw ratio at a low temperature is within the range, small-sized and uniform pores may be formed at each region and on the surface of the film, and furthermore, since tension required in the process becomes lower than breaking strength, the film may be easily fractured. In order to maintain the tension to be low, the draw ratio may be less than or equal to 300%, less than or equal to 200%, or less than or equal to 150%. Furthermore, when the draw ratio is within the range, fibril of an amorphous region is sufficiently formed in the low temperature drawing process and thus may accomplish desired permeability or porosity.

The method of manufacturing the porous film may further include subjecting the drawn film at a low temperature to 10% to 400% second drawing at a temperature of $(T_m-70)$ ° C. to $(T_m-3)$ ° C. That is, the method of manufacturing the porous film according to an embodiment may include extrusion-molding a composition including polyethylene having density of greater than 0.95 g/cm³ and pore-forming particles to form a precursor film, annealing the precursor film at a temperature of $(T_m-80)$ ° C. to $(T_m-3)$ ° C., subjecting the annealed film to 50% to 400% first drawing at a low temperature of 0° C. to 50° C., and subjecting the first drawn film to 10% to 400% second drawing at a temperature of $(T_m-70)$ ° C. to $(T_m-3)$ ° C. When the second drawing is added, the pore size may be increased and the permeability of the separator may be improved by increasing the pore uniformity.

When the second drawing is performed at a ratio of less than 10%, process characteristics of improving permeability by expanding the pore having a lamellar-fibril structure formed in the first drawing may not be realized, and when the ratio of the second drawing is greater than or equal to 400%, porosity of the film is extremely increased, or strength thereof is deteriorated, and accordingly, the film may not be appropriate for a separator and fractured during the process. In order to secure a uniform pore structure and distribution, the second drawing may be performed at a temperature of $(T_m-70)$ ° C. to $(T_m-3)$ ° C. by using a roll-type equipment and through a uniaxial drawing in a vertical direction (MD direction), and a draw ratio thereof may be in a range of 10% to 400%, for example, 40% to 250%, or 50% to 150% in the vertical direction. The second drawing may be controlled depending on characteristics of the precursor film but for example, performed in a range of 90° C. to 135° C. The pore uniformity of the surface may be maintained by performing first and second drawing separately.

Subsequently, heat setting may be additionally performed, if necessary. The heat setting is a process of reducing a residual stress and a shrinkage ratio. The heat setting includes relaxing the film to −1% to −50% of the drawn vertical or horizontal length after drawing the film to 1% to 50% through the heat treatment by using the roll type equipment. The heat setting may be performed at a temperature of $(T_m-50)$ ° C. to $(T_m-3)$ ° C. When the heat setting is additionally performed, a shrinkage ratio at a high temperature is decreased and thus tends to increase heat resistance characteristics of a rechargeable cell manufactured by applying the porous film.

In an embodiment, a separator including the porous film is provided.

The separator may be a separator for an electrochemical cell or a separator for a rechargeable lithium cell.

The separator may be made of only the aforementioned porous film and may further include a porous film and a functional layer formed on one or both surfaces of the porous film. The functional layer may be a porous adhesive layer improving adherence to an electrode or a heat resistant porous layer improving heat resistance. The functional layer may include a binder resin and/or particle.

In an embodiment, an electrochemical cell includes a positive electrode, a negative electrode, and the aforementioned separator which are filled with an electrolyte.

The electrochemical cell is not particularly limited, and may be any known in this art of the present invention. For example, the electrochemical cell may be a rechargeable lithium cell such as a lithium metal rechargeable cell, a lithium ion secondary cell, a lithium polymer rechargeable cell, or a lithium ion polymer rechargeable cell.

Figure 4:
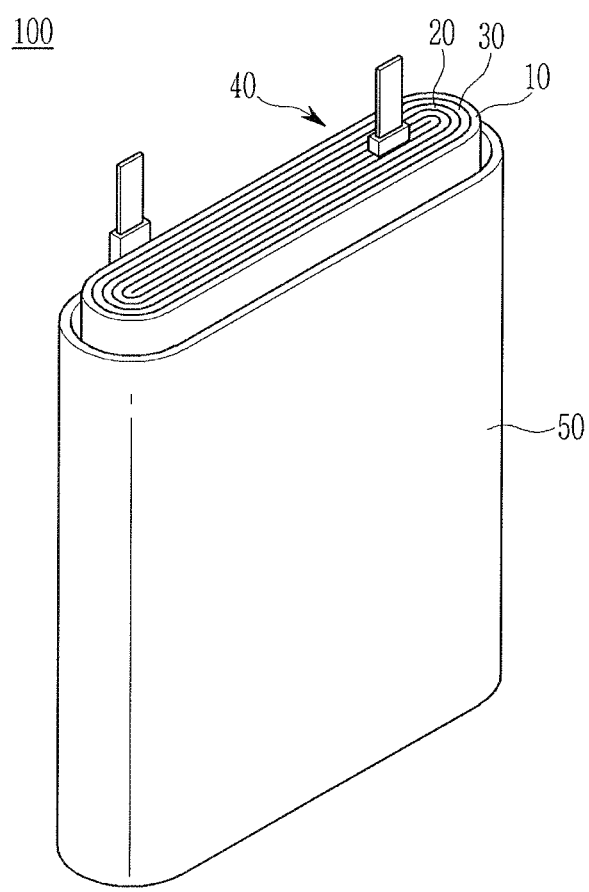
FIG. 4 is an exploded perspective view of an electrochemical cell according to an embodiment.

FIG. 4 is an exploded perspective view of an electrochemical cell according to an embodiment. An electrochemical cell according to an embodiment is for example illustrated with a prismatic cell, the present invention is not limited thereto, and may be applied to various cells such as a lithium polymer cell or a cylindrical cell.

Referring to FIG. 4, an electrochemical cell 100 according to an embodiment includes a wound electrode assembly 40 including a separator 30 between a positive electrode 10 and a negative electrode 20, and a case 50. The positive electrode 10, the negative electrode 20, and the separator 30 are impregnated in an electrolyte solution (not shown).

The separator 30 is the same as described above.

The positive electrode 10 includes a positive current collector and a positive active material layer formed on the positive current collector. The positive active material layer includes a positive active material, a binder, and optionally a conductive material.

The positive current collector may use aluminum, nickel, and the like, but is not limited thereto.

The positive active material may use a compound capable of intercalating and deintercalating lithium. Specifically, at least one of a composite oxide or a composite phosphate of a metal selected from cobalt, manganese, nickel, aluminum, iron, or a combination thereof and lithium may be used. More specifically, the positive active material may use a lithium cobalt oxide, a lithium nickel oxide, a lithium manganese oxide, a lithium nickel cobalt manganese oxide, a lithium nickel cobalt aluminum oxide, a lithium iron phosphate, or a combination thereof.

The binder improves binding properties of positive active material particles with one another and with a current collector, and specific examples may be polyvinyl alcohol, carboxylmethyl cellulose, hydroxypropyl cellulose, diacetyl cellulose, polyvinylchloride, carboxylatedpolyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadienerubber, an epoxy resin, nylon, and the like, but are not limited thereto. These may be used alone or as a mixture of two or more.

The conductive material improves conductivity of an electrode and examples thereof may be natural graphite, artificial graphite, carbon black, carbon fiber, carbon nanotube, a metal powder, a metal fiber, and the like and may be used alone or as a mixture of two or more. The metal powder and the metal fiber may include a metal of copper, nickel, aluminum, silver, and the like.

The negative electrode 20 includes a negative current collector and a negative active material layer formed on the negative current collector.

The negative current collector may use copper, gold, nickel, a copper alloy, and the like, but is not limited thereto.

The negative active material layer may include a negative active material, a binder and optionally a conductive material.

The negative active material may be a material that reversibly intercalates/deintercalates lithium ions, a lithium metal, a lithium metal alloy, a material being capable of doping and dedoping lithium, a transition metal oxide, or a combination thereof.

The material that reversibly intercalates/deintercalates lithium ions may be a carbon material which is any generally-used carbon-based negative active material, and examples thereof may be crystalline carbon, amorphous carbon, or a combination thereof. Examples of the crystalline carbon may be natural graphite or artificial graphite and may be amorphous, sheet-shaped, flake-shaped, spherical shape or fiber-shaped. Examples of the amorphous carbon may be soft carbon or hard carbon, a mesophase pitch carbonized product, fired coke, and the like. The lithium metal alloy may be an alloy of lithium and a metal selected from Na, K, Rb, Cs, Fr, Be, Mg, Ca, Sr, Si, Sb, Pb, In, Zn, Ba, Ra, Ge, Al, and Sn. The material being capable of doping and dedoping lithium may be Si, $SiO_x$ (0<x<2), a Si—C composite, a Si—Y alloy, Sn, $SnO_2$, a Sn—C composite, a Sn—Y, and the like, and at least one of these may be mixed with $SiO_2$. Specific examples of the element Y may be selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po, and a combination thereof. The transition metal oxide may be a vanadium oxide, a lithium vanadium oxide, and the like.

The binder and the conductive material used in the negative electrode 20 may be the same as the binder and conductive material of the positive electrode.

The positive electrode 10 and the negative electrode 20 may be manufactured by mixing each active material composition including each active material and a binder, and optionally a conductive material in a solvent, and coating the active material composition on each current collector. Herein, the solvent may be N-methylpyrrolidone, and the like, but is not limited thereto. The electrode manufacturing method is well known, and thus is not described in detail in the present specification.

The electrolyte solution includes an organic solvent and a lithium salt.

The organic solvent serves as a medium for transmitting ions taking part in the electrochemical reaction of a cell. Specific examples thereof may be selected from a carbonate-based solvent, an ester-based solvent, an ether-based solvent, a ketone-based solvent, an alcohol-based solvent, and an aprotic solvent.

Examples of the carbonate-based solvent may be dimethylcarbonate (DMC), diethyl carbonate (DEC), dipropyl carbonate (DPC), methylpropyl carbonate (MPC), ethylpropyl carbonate (EPC), ethylmethyl carbonate (EMC), ethylene carbonate (EC), propylene carbonate (PC), butylene carbonate (BC), and the like. Particularly, when the linear carbonate compounds and cyclic carbonate compounds are mixed, an organic solvent having a high dielectric constant and a low viscosity may be provided. The cyclic carbonate compound and the linear carbonate compound are mixed together in a volume ratio ranging from 1:1 to 1:9.

Examples of the ester-based solvent may be methylacetate, ethylacetate, n-propylacetate, dimethylacetate, methylpropionate, ethylpropionate, γ-butyrolactone, decanolide, valerolactone, mevalonolactone, caprolactone, and the like. Examples of the ether-based solvent may be dibutylether, tetraglyme, diglyme, dimethoxyethane, 2-methyltetrahydrofuran, tetrahydrofuran, and the like. Examples of the ketone-based solvent may be cyclohexanone, and the like, and examples of the alcohol-based solvent may be ethanol, isopropyl alcohol, and the like.

The organic solvent may be used alone or in a mixture of two or more, and when the organic solvent is used in a mixture of two or more, the mixture ratio may be controlled in accordance with a desirable cell performance.

The lithium salt is dissolved in an organic solvent, supplies lithium ions in a cell, basically operates an electrochemical cell, and improves lithium ion transportation between positive and negative electrodes therein.

Examples of the lithium salt may be $LiPF_6$, $LiBF_4$, $LiSbF_6$, $LiAsF_6$, $LiN(SO_3C_2F_2)_2$, $LiN(CF_3SO_2)_2$, $LiC_4F_9SO_3$, $LiClO_4$, $LiAlO_2$, $LiAlCl_4$, $LiN(C_xF_{2x+1}SO_2)$ ($C_yF_{2y+1}SO_2$), x and y are natural numbers, LiCl, LiI, $LiB(C_2O_4)_2$, or a combination thereof.

The lithium salt may be used in a concentration ranging from 0.1 M to 2.0 M. When the lithium salt is included within the above concentration range, an electrolyte solution may have improved performance and lithium ion mobility due to optimal electrolyte conductivity and viscosity.

Hereinafter, the embodiments are illustrated in more detail with reference to examples. It should be understood, however, that the following examples are for purposes of illustration only and are not intended to limit the scope.

Example 1

First polyethylene (Prime Polymer, MI 0.3, density 0.96 g/cm³, $T_m$ 136° C.) and second polyethylene (MI 0.9, density 0.954 g/cm³, $T_m$ 130° C., Lotte Chemical Corp.) were mixed in 1:1 part by weight to prepare 100 parts by volume of polyethylene and then, mixed with 15 parts by volume of calcium carbonate particles having an average particle size of 60 nm and surface-treated with fatty acid (Okyumhwa RA, DongHo Calcium Corp.) to prepare a composition. The composition was formed into a 30 µm-thick precursor film under an extrusion condition at 190° C. to 250° C. at a draw ratio of 40 to 45, and the precursor film was annealed at 120° C. for 2 minutes and treated though once 100% first drawing (low temperature drawing) at 25° C. in a MD direction and then, 100% second drawing (high temperature drawing) at 120° C. in the MD direction to obtain a 20 µm to 25 µm-thick porous film. FIG. 2 shows a SEM image of the surface of the porous film, and FIG. 3 shows a SEM image of the cross-section of the porous film in order to examine an internal structure thereof. Referring to FIGS. 2 and 3, surface pores had an about 200 nm to about 300 nm-long minor axis, and inner pores had a size of about 300 nm to about 400 nm.

Comparative Example 1

Figure 5:
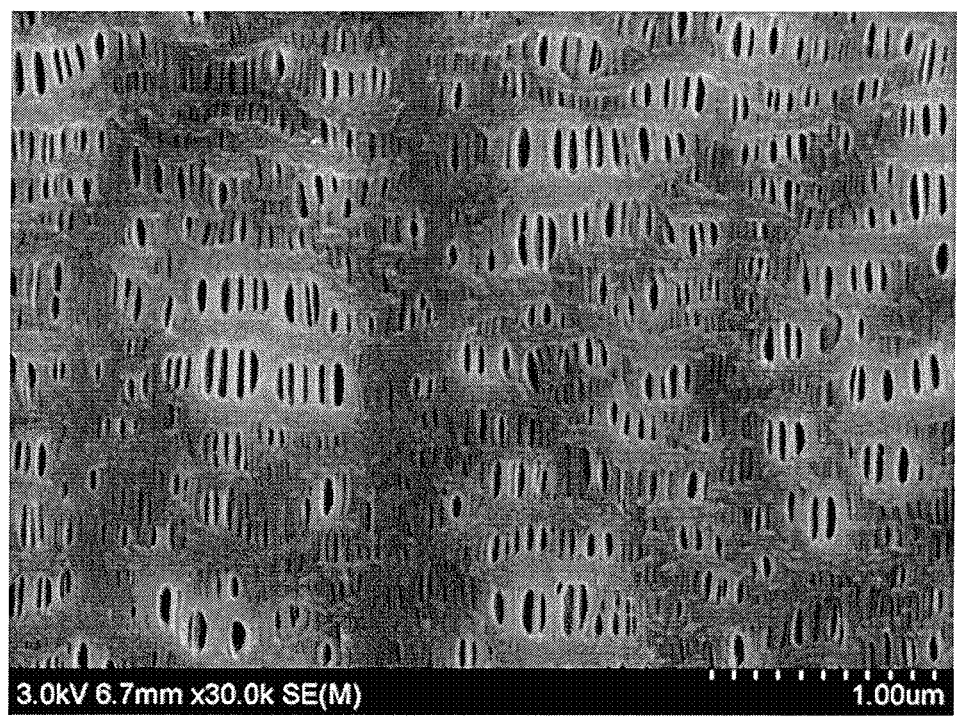
FIG. 5 is a SEM photograph of the surface of the porous film manufactured in Comparative Example 1.
Figure 6:
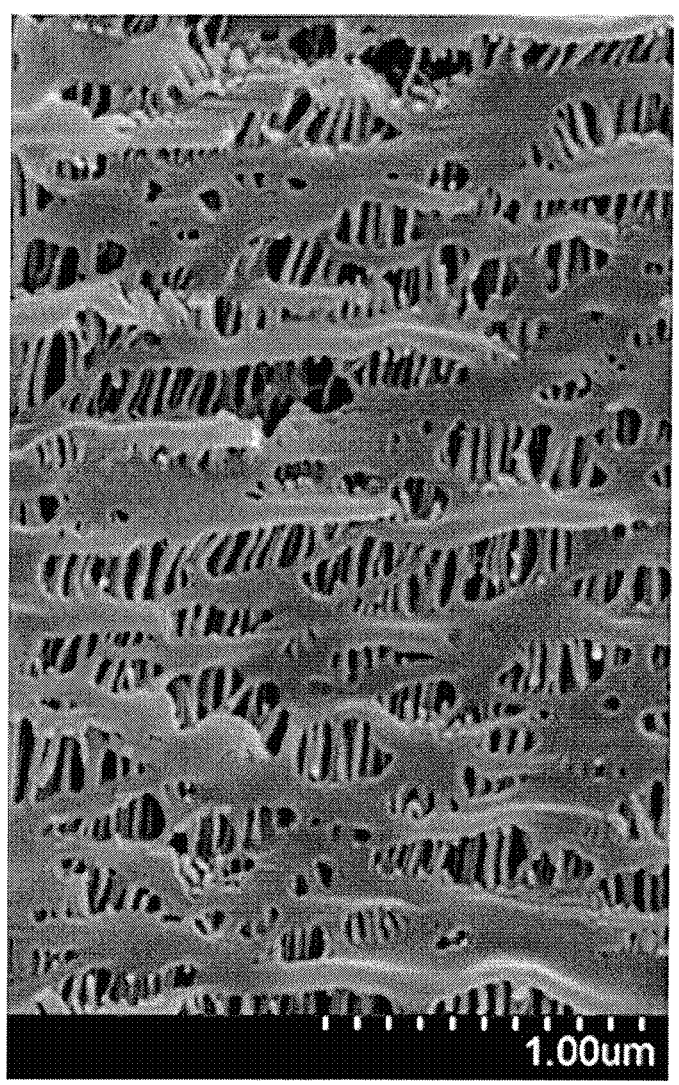
FIG. 6 is a scanning electron microscope (SEM) image of the cross-section of the porous film manufactured in Comparative Example 1.

A porous film was formed according to the same method as Example 1 except that polypropylene was used instead of the polyethylene, the draw ratio was set at 150, and the calcium carbonate particles were not used. A SEM image of the surface of the film was shown in FIG. 5, and a SEM image of the cross section of the film to observe an inner structure thereof was shown in FIG. 6. Referring to FIGS. 5 and 6, pores by the pore-forming particles were not present, surface pores and inner pores had no size difference, which shows totally different morphology from those shown in FIGS. 2 and 3.

Comparative Example 2

Figure 7:
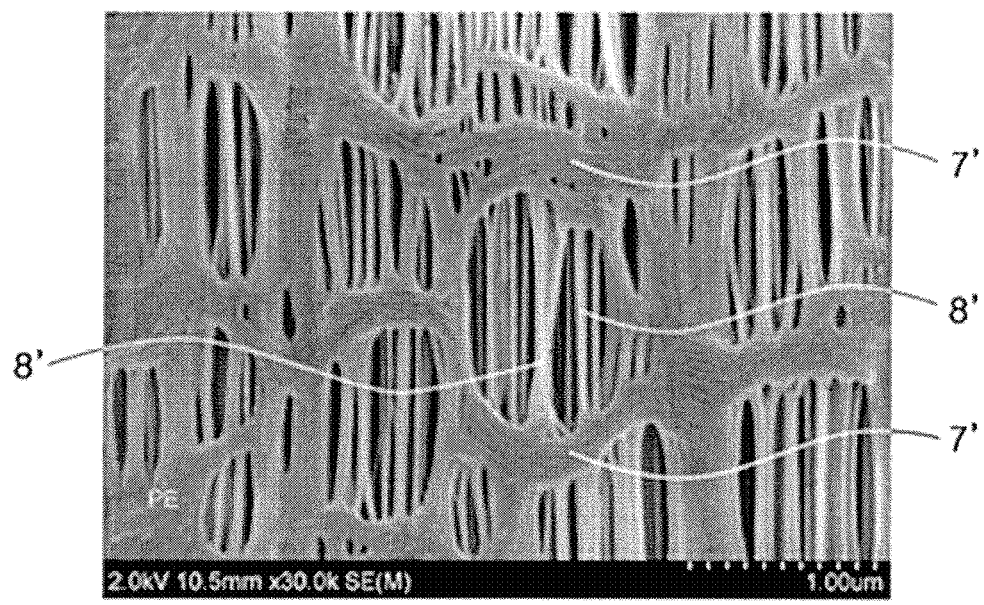
FIG. 7 is a SEM photograph of the surface of the porous film manufactured in Comparative Example 2.
Figure 8:
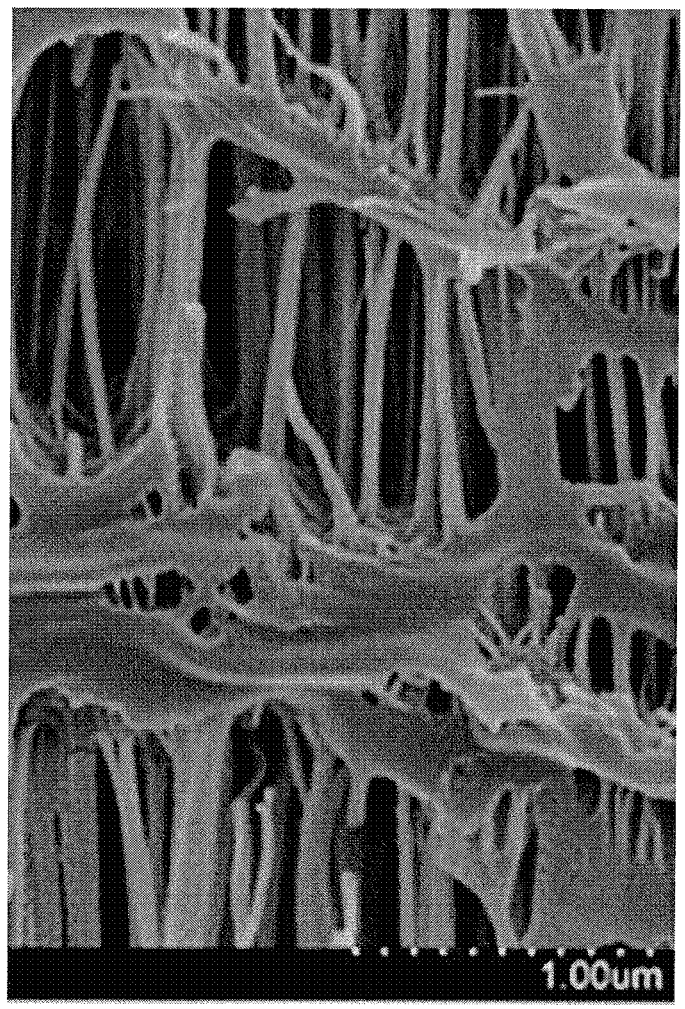
FIG. 8 is a scanning electron microscope (SEM) image of the cross-section of the porous film manufactured in Comparative Example 2.

A porous film was formed according to the same method as Example 1 except that the calcium carbonate particles were not used, and the draw ratio was set into 150. A SEM image of the surface of the film was shown in FIG. 7, and a SEM image of the cross section of the film was shown in FIG. 8 to observe an inner structure thereof. Referring to FIG. 7, the porous film of Comparative Example 2 included a fibril 8' formed between lamellar 7' and lamellar 7' like the porous film of Example 1 but had no pores by the pore-forming particles and no size difference between surface pores and inner pores, which shows totally different morphology from those shown in FIGS. 2 and 3.

Comparative Example 3

Figure 9:
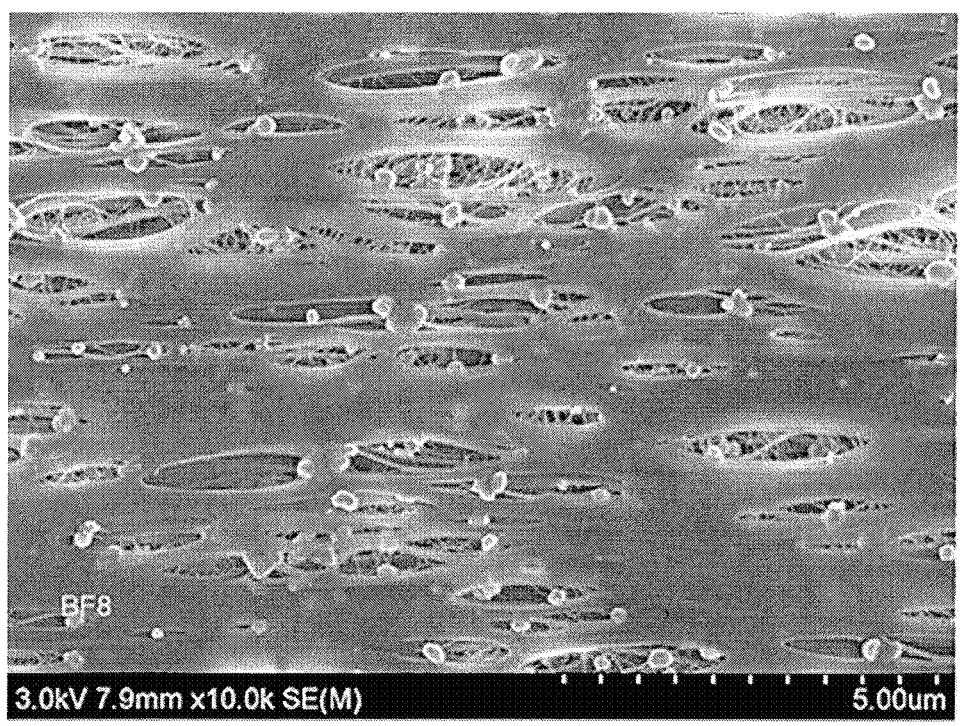
FIG. 9 is a SEM photograph of the surface of the porous film manufactured in Comparative Example 3.

A porous film was formed according to the same method as Example 1 except that polyethylene having low density of 0.93 g/cm³ was used. A SEM image of the surface of the film was shown in FIG. 9. Referring to FIG. 9, pores by the pore-forming particles were found, but neither a lamellar and fibril structure nor a pore according thereto was formed.

Evaluation Example 1: Permeability

Permeability of each porous film according to Example 1 and Comparative Example 1 to Comparative Example 3 was measured by cutting the porous film at different ten positions into a size capable of containing a disk having a diameter of greater than or equal to 1 inch to obtain ten samples and measuring time until each sample passed 100 cc of air by using a permeability measuring device (Asahi Seiko Co., Ltd.). The time was repetitively five times measured and then, averaged to obtain the permeability and the results are shown in Table 1.

Evaluation Example 2: Porosity

The volume (cm³) and mass (g) of each porous film according to Example 1 and Comparative Example 1 to Comparative Example 3 were measured and the porosity was calculated by using them along with density (g/cm³) of the films through the following equation. The density of the film was calculated form density of a material thereof.

Porosity (%)=(volume-mass/density of porous film)/volume×100

Evaluation Example 3: Elasticity Recovery Rate after Annealing

Elasticity recovery rates of the films according to Example 1 and Comparative Example 1 to Comparative Example 3 after annealing were measured at room temperature with a universal tester (UTM). Specifically, when each porous film manufactured in Example 1 and Comparative Example 1 to Comparative Example 3 was drawn from a grip interval of 50 mm ($L_0$) at 50 mm/min until it was 100% drawn and was immediately recovered at a speed of 50 mm/min, a length ($L_1$) at which a residual stress became 0 was measured and then an elasticity recovery rate was calculated using the following equation.

Elasticity recovery rate (%)=($L_1$-$L_0$)/$L_0$×100

Evaluation Example 4: Tensile Strength

The porous films according to Example 1 and Comparative Example 1 to Comparative Example 3 were respectively cut into a rectangle with a size of a width (MD) 10 mm×a length (TD) 50 mm at ten different points to obtain ten specimens, the specimens were respectively mounted on UTM (a tensile tester) and clipped to have a measurement length of 20 mm and then, pulled and measured regarding average tensile strength in the machine direction (MD) and the transverse direction (TD).

Evaluation Example 5: Thermal Shrinkage Rate

Each porous film according to Example 1 and Comparative Example 1 to Comparative Example 3 was cut into a size of a width (MD) 5 cm×a length (TD) 5 cm, obtaining ten samples in total. Each specimen was stored in a 105° C. chamber for 1 hour, its shrinkage in the machine direction (MD) was measured and averaged, obtaining its thermal shrinkage ratio.

Evaluation Example 6: Puncture Strength

Each porous film according to Example 1 and Comparative Examples 1 to 3 was cut into a size of a width (MD) 50 mm×a length (TD) 50 mm at ten different points to obtain ten specimens, each specimen was put on a 10 cm hole by using a KATO tech G5 equipment, and then, its strength was measured when punctured while pushed with a 1 mm probe needle. The puncture strength of each specimen was three times measured and then, averaged.

Evaluation Example 7: Evaluation of Formation Process Inferiority Rate

The porous films according to Example 1 and Comparative Example 1 to Comparative Example 3 were used to respectively assembling 100 cells as a separator: LCO (LiCoO$_2$) as a positive active material was coated to be 94 μm thick on both surfaces of a 14 μm-thick aluminum foil, dried, and compressed to manufacture a positive electrode having a total thickness of 108 μm. A negative electrode having a total thickness of 128 μm was manufactured by coating a mixture of natural graphite and artificial graphite in a ratio of 1:1 as a negative active material to be 120 μm thick on both surfaces of an 8 μm-thick copper foil. An electrolyte solution was prepared by dissolving 1.5 M LiPF$_6$ (PANAX ETEC Co., Ltd.) in an organic solvent of EC/EMC/DEC+0.2% LiBF$_4$+5.0% FEC+1.0% VC+3.00% SN+1.0% PS+1.0% SA. The separator was interposed between the positive and negative electrodes and then, wound therewith to obtain an electrode assembly having a size of 7 cm×6.5 cm. The electrode assembly wad primarily compressed at 100° C. for 3 seconds under a pressure of 5 kgf/cm$^2$ and then, put in an aluminum coating pouch (8 cm×12 cm), and the pouch was sealed at 143° C. and then, degassed with a degassing machine for 3 minutes until air was not left after inserting 6.5 g of the electrolyte solution into the pouch. The cell was aged for 12 hours at 25° C. and secondarily compressed at 110° C. for 120 seconds under a pressure of 20 kgf/cm$^2$.

The OCV (Open Circuit Voltage) drops of the manufactured cells during a formation process were measured to obtain inferiority rates.

Evaluation Example 8: Ion Conductivity

The ion conductivity was measured using a 4-probe method using impedance equipment at 30° C. regarding each porous film prepared according to Example 1 and Comparative Examples 1 to 3.

The results according to Evaluation Examples 1 to 8 are shown in Table 1.

TABLE 1

|  | Example 1 | Comparative Example 1 | Comparative Example 2 | Comparative Example 3 |
|---|---|---|---|---|
| Permeability (sec/100 cc · μm) | 200 | 550 | 310 | 1,100 |
| Porosity (%) | 45 | 41 | 42 | 38 |
| Elasticity recovery rate after annealing (%) | 50 | 85 | 80 | 20 |
| Tensile strength (Kgf/cm$^2$) | 1,820 | 1,420 | 1,480 | 700 |
| Thermal shrinkage rate (MD) (%) (105° C., 1 hr) | 3 | 3.5 | 5 | 7 |
| Puncture strength (gf) | 300 | 350 | 170 | 250 |
| Inferiority rate (%) | 2 | 3 | 4 | 10 |
| Ion conductivity (S/cm) | $12.21 \times 10^{-4}$ | $11.37 \times 10^{-4}$ | $9.45 \times 10^{-4}$ | $1.25 \times 10^{-4}$ |

As shown in Table 1, the porous film of Example 1 had inner pores having a larger size than an average size of pores on the surface and accordingly, greatly improved permeability and exhibited excellent characteristics in terms of porosity, tensile strength, ion conductivity, and the like. On the other hand, Comparative Example 1 using polypropylene and Comparative Example 2 including no pore-forming particles exhibited deteriroated permeability, porosity, tensile strength, and thermal shrinkage rate, and the porous film of Comparative Example 3 including low density polyethylene having density of less than or equal to 0.95 g/cm$^3$ exhibited greatly deteriorated permeability, tensile strength, and ion conductivity and in addition, a high defect rate.

In other words, a porous film according to an embodiment exhibiting the properties may be used as a separator to secure sufficient permeability and thus improve ion conductivity without deteriorating a thermal shrinkage rate, tensile strength, puncture strength, and the like and thus provide an electrochemical cell having improved output characteristics.

Although the embodiment has been described above, it is to be understood that the structure actually embodied is not limited thereto, and that various modifications can be made within the scope of the claims and the detailed description and accompanying drawings of the invention.

[Description of Symbols]

| 10: positive electrode | 20: negative electrode |
|---|---|
| 30: separator | 40: electrode assembly |
| 50: case | 100: electrochemical cell |

The invention claimed is:

1. A porous film comprising polyethylene and pore-forming particles, wherein the porous film has a structure comprising lamella and fibril and an average size of pores located inside the porous film is larger than an average size of pores located on the surface of the porous film.

2. The porous film of claim 1, wherein the polyethylene has density of greater than 0.95 g/cm$^3$.

3. The porous film of claim 1, wherein a ratio of the average size of pores located inside the porous film relative to the average size of pores located on the surface of the porous film (average size of inner pores/average size of surface pores) is 1.1 to 20.

4. The porous film of claim 1, wherein an average length of a minor axis of the pores located inside the porous film is 10 nm to 400 nm and an average length of a minor axis of the pores located on the surface of the porous film is 5 nm to 300 nm.

5. The porous film of claim 1, wherein an average thickness of a lamellar located inside the porous film is larger than an average thickness of the lamellar located on the surface of the porous film.

6. The porous film of claim 5, wherein a thickness of the lamellar located inside the porous film is 20 nm to 500 nm and a thickness of the lamellar located on the surface of the porous film is 10 nm to 200 nm.

7. The porous film of claim 1, wherein the porous film comprises first pores formed by the pore-forming particles and second pores formed between the lamellar of the polyethylene on the surface of the porous film, and an average size of the first pores is larger than an average size of the second pores.

8. The porous film of claim 7, wherein an average length of a minor axis of the first pores is 4 to 30 times the average length of a minor axis of the second pores.

9. The porous film of claim 7, wherein an average length of a minor axis of the first pores is 50 nm to 250 nm and an average length of a minor axis of the second pores is 5 nm to 50 nm.

10. The porous film of claim 1, wherein a crystallinity of the polyethylene is 17% to 96%.

11. The porous film of claim 1, wherein an average particle diameter of the pore-forming particles is 5 nm to 300 nm.

12. The porous film of claim 1, wherein the pore-forming particles are included in an amount of 2.5 parts by volume to 40 parts by volume based on a total volume of the porous film.

13. The porous film of claim 1, wherein the pore-forming particles are selected from alumina, silica, titania, zirconia, magnesia, ceria, zinc oxide, iron oxide, silicon nitride, titanium nitride, boron nitride, calcium carbonate, barium sulfate, barium titanite, aluminum sulfate, aluminum hydroxide, magnesium hydroxide, calcium titanite, talc, calcium silicate, magnesium silicate, boehmite, and a combination thereof.

14. The porous film of claim 1, wherein the pore-forming particles are organic particles selected from polystyrene, polyethylene, polypropylene, polyvinylidene fluoride, polytetrafluoroethylene, polyurethane, polymethyl pentene, polyethyleneterephthalate, polycarbonate, polyester, polyvinyl alcohol, polyacrylonitrile, a silicon acryl-based rubber, an ethylene-methylacrylate copolymer, polymethyleneoxide, polymethylmethacrylate, polyethylene oxide, polyamide, polyamideimide, polysulfone, polyethylsulfone, polyphenylenesulfide, polyarylate, polyimide, polyaramid, cellulose, a cellulose modified product, a melamine-based resin, a phenol-based resin, and a combination thereof.

15. The porous film of claim 1, wherein the pore-forming particles are surface-treated with a surfactant.

16. The porous film of claim 1, wherein a permeability of the porous film is less than or equal to 400 sec/100 cc·μm.

17. A separator comprising the porous film of claim 1.

18. The separator of claim 17, wherein the separator further comprises a functional layer formed on one or both surfaces of the porous film.

19. An electrochemical cell comprising
a positive electrode, a negative electrode, the separator of claim 17, and an electrolyte.

20. The electrochemical cell of claim 19, wherein the electrochemical cell is a rechargeable lithium cell.

* * * * *